(12) United States Patent  (10) Patent No.: US 7,412,591 B2
Ma et al.  (45) Date of Patent: Aug. 12, 2008

(54) APPARATUS AND METHOD FOR SWITCHABLE CONDITIONAL EXECUTION IN A VLIW PROCESSOR

(75) Inventors: Yung-Cheng Ma, Hsinchu (TW); Tengh-Yih Wang, Shanhua Township, Tainan County (TW); Hsien-Feng Kuo, Taipei (TW); Chi-Lung Wang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 408 days.

(21) Appl. No.: 11/155,120

(22) Filed: Jun. 18, 2005

(65) Prior Publication Data

US 2006/0288195 A1  Dec. 21, 2006

(51) Int. Cl.
   *G06F 9/30* (2006.01)
(52) U.S. Cl. .................................. 712/229; 712/24
(58) Field of Classification Search ................ 712/24, 712/229
   See application file for complete search history.

(56) References Cited

U.S. PATENT DOCUMENTS

| 5,946,483 | A | 8/1999 | Boutaud et al. ............. 395/564 |
|---|---|---|---|
| 5,964,825 | A | 10/1999 | Seshan et al. ............... 708/490 |
| 5,999,738 | A | 12/1999 | Schlansker et al. .......... 390/709 |
| 6,016,543 | A | 1/2000 | Suzuki et al. ............... 712/233 |
| 6,374,346 | B1 | 4/2002 | Seshan et al. ............... 712/221 |
| 6,442,679 | B1 | 8/2002 | Klauser et al. .............. 712/218 |
| 6,513,109 | B1 | 1/2003 | Gschwind et al. ........... 712/200 |
| 6,792,524 | B1 * | 9/2004 | Peterson et al. ............. 712/235 |
| 6,961,847 | B2 * | 11/2005 | Davies et al. ............... 712/235 |
| 2006/0149944 | A1 * | 7/2006 | Eisen et al. ................. 712/235 |
| 2006/0161762 | A1 * | 7/2006 | Eisen et al. ................. 712/233 |

* cited by examiner

*Primary Examiner*—William M. Treat

(57) ABSTRACT

An apparatus for switchable conditional execution in a VLIW processor is provided, comprising one or more decoders, one or more ALU with control units, and a register file. The decoder loads and decodes instructions from a fetch unit for decoding and sending the decoded instructions to the ALU with control units for execution. The register file stores and forwards the results on result buses to the decoders. The execution of a VLIW instruction includes a fetch stage, a decode stage, plural execution stages and a write-back stage. The invention has the features of approximate ASIC timing by conditional write-back with the compiler support for the conditional write-back, condition resolved just before write-back, software selective conditional issue and conditional write-back modes, and without hardware interlock/dependence checking for the VLIW processor.

15 Claims, 14 Drawing Sheets

APPARATUS AND METHOD FOR SWITCHABLE CONDITIONAL EXECUTION IN A VLIW PROCESSOR

FIELD OF THE INVENTION

The present invention generally relates to an apparatus for conditional execution in a processor, and more specifically to an apparatus and method for switchable conditional execution in a Very-Long Instruction Word (VLIW) processor for low energy-consumption and high performance.

BACKGROUND OF THE INVENTION

Many modern microprocessors use pipelining for performance purpose, for example, the Very-Long Instruction Word (VLIW) processors. Conditional execution has long been an important aspect of the pipeline execution. For those processors supporting conditional execution, their instruction set allows commands or selected commands marked as conditional mode. For example, the following statement assigns the value $r_4 * r_5$ to the variable $r_3$ only when $r_1$ is greater than $r_2$:

if $(r_1 > r_2) r_3 = r_4 * r_5;$

This statement may be complied into a conditional instruction supported by a hypothetical processor, as follows:

cmpgt p0=$r_1,r_2$

[p0] mpy $r_3=r_4*r_5$ where [p0] mpy is a conditional instruction, that is, an instruction that is marked as conditional mode. The multiplication and assignment will be executed only when the condition [p0] is true. The two major benefits of using conditional execution are that it will reduce the pipeline stall caused by branch instruction, and it allows dual-path execution to implement the if-then-else statement in a highly-parallel hardware environment, such as VLIW, which leads to performance improvement.

Numerous research reports have been disclosed and many products are marketed since Cray-I was first introduced in 1978 to allow marking some instructions conditional mode.

U.S. Pat. No. 6,016,543 disclosed a microprocessor for controlling the conditional execution of instructions, which uses hardware to detect the data dependency among the instructions and insert hardware interlock to ensure the correctness of the conditional execution instructions. The disclosed technology is applicable to a superscalar processor. FIG. 1 is a timing chart showing a pipeline interlock cancel process for multiplication data executed in the disclosed microprocessor having conditional execution instructions. As shown in FIG. 1, the first ldw is a conditional instruction, and the subsequent mul2h depends on the result of the conditional instruction ldw. During the execution, the mul2h instruction is stalled at the decode stage to wait for the result of ldw condition. When the result of the condition is true, the multi2h instruction is executed, shown as the upper part of FIG. 1. On the other hand, when the condition is false, the ldw instruction is cancelled and the mul2h instruction directly enters the execution stage without waiting for the results of the ldw.

U.S. Pat. No. 6,513,109 disclosed a method for implementing execution predicates in a computer processing system, which applies the speculative execution of branch instruction to the conditional execution. FIG. 2 is a diagram illustrating a system for performing out-of-order superscalar execution with predicate prediction according to the disclosed method. As shown in FIG. 2, when encountering a conditional instruction, the predictor predicts the result of the condition. Based on the prediction, the corresponding instructions are issued to the functional unit for execution. After execution, the results of the execution are stored in a future register file to be used by subsequent instructions. The instruction will stay in the in-order retirement queue for the confirmation of the result of the condition. All the instructions will sequentially confirm the result and write-back to the architecture register file. If a prediction error is found during the confirmation, all the subsequent instructions in the retirement queue will be cleared and the execution re-starts from the point where the prediction error occurs.

U.S. Pat. No. 6,374,346 disclosed yet another method applicable to a VLIW digital signal processing (DSP) processor. Unlike conventional processors where only some instructions can be assigned for conditional execution and the conditions are from a small number of flag registers set by special instructions, the disclosed method allows any instruction in the instruction set to be assigned for conditional execution and the conditions are from the general purpose registers, which can be set by any instruction, not limited to comparison instructions. FIG. 3 shows a schematic view of the pipeline behavior of an embodiment of this design.

As the conditional execution has great impact on the pipeline behavior, it is necessary to take the pipeline behavior into account when developing conditional execution mechanisms. There are three major pipeline behaviors when conditions are involved. The conditions can be interpreted and executed at the decode stage, the first execution stage or the last execution stage.

FIG. 4 shows a conventional pipeline behavior in which the conditions are interpreted and executed at the decode stage. In this approach, the condition of a conditional instruction is treated as an operand of an instruction, and is read in at the decode stage of the instruction. The instruction is then determined, based on the condition, whether to enter the execution stage or turn to NOP for no execution. This mode is also called the conditional issue mode. This design is direct and simple, thus low cost. Many commercial processors, including ARM, SUN SPARC, and Intel Itanium, all use this mode. The advantage of this mode is the early determination of NOP. When the functional units include energy-saving design, such as clock-gating when encountering NOP, energy consumption can be reduced. On the other hand, it has the disadvantage of longer execution latency. As shown in FIG. 4, even with forwarding path, there is a one-cycle delay between the instruction computing the condition and the instruction using the condition.

FIG. 3 shows a conventional pipeline behavior in which the conditions are interpreted at the first execution stage to reduce the pipeline stall. As shown in FIG. 3, the condition is interpreted at the first execution stage and then transmitted through the forwarding path. This design forms a smooth pipeline and requires no stall between the instruction computing the condition and the instruction using the condition. This design is used in the TI 320C6xxxx series DSP processors.

FIG. 5 shows a conventional pipeline behavior in which the conditions are interpreted at the last execution stage. The delay of the interpretation of the conditions to a later stage enables the condition interpretation and data computation to be executed in parallel. A shown in FIG. 5, the conditional instruction interprets the condition through the forwarding path at the last execution stage, and determines whether the execution results should be written-back.

FIG. 6A and FIG. 6B show the timing of an if-then-else statement execution using a conventional branch/conditional issue mode and using ASIC architecture, respectively. The if-then-else statement is as follows:

if (u.v)

x=a*b+c*d;

else x=a*b−c*d;

y=x*f;

As seen in FIG. 6A, the determination of the condition must be executed before the data-computing for the conventional branch/conditional issue mode. While using ASIC as seen in FIG. 6B, the determination of the condition can be executed in parallel with the data-computing through the use of a multiplexer for selecting the comparison result for the condition. Therefore, the conditional execution has a great impact on the pipeline behavior and the eventual performance of the VLIW processor. The power consumption of many discarded computations may pose as an important constraint in the VLIW architecture design. It is imperative to provide a design that is flexible in both saving energy consumption as well as achieving near-ASIC performance.

SUMMARY OF THE INVENTION

The present invention has been made to overcome the aforementioned drawback of conventional techniques. The primary object of the present invention is to provide an apparatus for conditional execution that can be used in a VLIW processor. The application of the present invention to the conventional VLIW processor can reduce the hardware complexity to realize conditional write-back. In addition, the present invention can switch between different execution modes. It can either perform the conditional execution in a conditional issue mode to save energy consumption or in a conditional write-back mode to achieve near-ASIC performance.

The switchable conditional execution apparatus is provided with one or more instruction decoders, one or more arithmetic logic unit (ALU) with control units, and a register file. Instruction decoders load and decode the instructions, then send the decoded instructions to ALU with control units for execution. Register file is for storing and forwarding the results on result bus to decoders. Source buses in the VLIW processor are connected to ALU with control units for acting as an input Result buses in the VLIW processor are connected to the output of ALU with control unit Both source bus and result bus are connected to main bus in the VLIW processor.

To achieve the aforementioned objects and features, the present invention provides a special instruction for switching between the energy-saving execution mode and the high-performance execution mode for conditional instructions. The execution of the special instruction will change the status register, which will affect the hardware operation of the processor. In the energy-saving mode, the processor will perform conditional execution using conditional issue mode described earlier. By determining the condition at an early stage of the pipeline, some instructions can be changed to NOP before execution. This saves energy. In the high-performance mode, the processor will perform conditional execution using conditional write-back mode. By delaying the determination of the condition to a later stage, the processor can schedule the instructions in a more parallel fashion to shorten the execution time.

Moreover, the compiler used for the present invention performs different instruction scheduling schemes in accordance with different execution modes. In the energy-saving mode, the compiler schedules the instructions in an in-order-scheduling fashion, as in a conventional VLIW processor. In high-performance mode, the compiler schedules the instructions in an out-of-order-scheduling fashion.

A method is also provided, performed in a VLIW processor having such a switchable conditional execution apparatus, in which an instruction format to switch between two conditional modes, i.e. conditional issue mode and conditional write-back mode is arranged. Different instruction scheduling schemas described above are performed by the compiler for the VLIW processor. The execution of such a VLIW instruction includes a fetch stage, a decode stage, a plurality of execution stages, and a write-back stage. For a conditional instruction, the conditional issue mode resolves conditions at the decode stage, while the conditional write-back mode resolves conditions at the last execution stage.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 7:
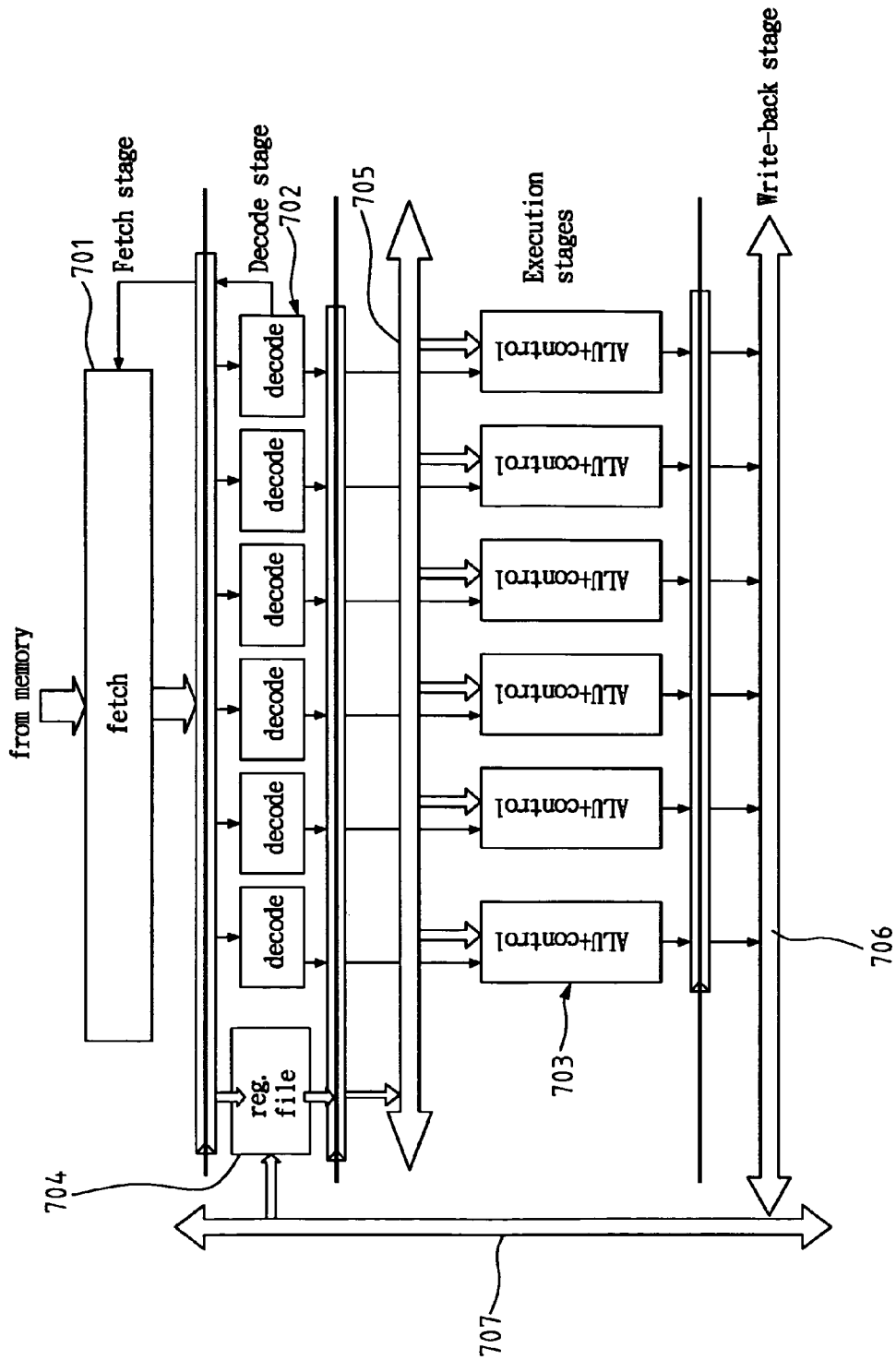
FIG. 7 shows a schematic view of a VLIW processor with an apparatus for switchable conditional execution according to the present invention.

FIG. 7 shows a schematic view of a VLIW processor with an apparatus for switchable conditional execution according to the present invention. As shown in FIG. 7, the VLIW processor comprises a fetch unit 701, one or more instruction decoders 702, one or more ALU with control units 703, a register file 704, a plurality of source buses 705, a plurality of result buses 706, and a plurality of main buses 707. Wherein, the switchable conditional execution apparatus of the present invention comprises the one or more instruction decoders 702, the one or more ALU with control units 703, and the register file 704.

Without loss of generality, the embodiment in FIG. 7 is a six-issue VLIW processor, that is, the processor includes six decoders and six ALU with control units. The number of instruction decoders and ALU with control units can be varied according to the design. Fetch unit 701 in the VLIW processor fetches instructions and data from a memory (not shown), and load the instructions to instruction decoders 702. Instruction decoders 702 decode the instructions and send the decoded instructions to ALU with control units 703 for execution. Register file 704, including a plurality of registers, is for storing and forwarding the results on result bus 706 in the VLIW processor to decoders 702. Source buses 705 in the VLIW processor are connected to ALU with control units 703 for acting as an input Result buses 706 in the VLIW processor are connected to the output of ALU with control units 703. Both source buses 705 and result buses 706 are connected to main buses 707 in the VLIW processor.

The execution of a VLIW instruction can be divided into four major stages, including a fetch stage, a decode stage, a plurality of execution stages, and a write-back stage. Fetch unit 701 is mainly involved in the fetch stage, instruction decoders 702 are mainly involved in the decode stage, and ALU with control units 703, results buses 706 and source buses 705 are involved in the execution stages and the write-back stage.

The apparatus for switchable conditional execution may be a digital signal processor (DSP). It may also further include a forwarding path (not shown) to forward the results at write-back stage to the first execution stage. In addition, the register file 704 may further have a forwarding circuit (not shown) to forward the results at write-back stage to the decode stage. The details of the decode stage and execution stages will be described later.

In the VLIW processor, the hardware does not perform data dependence detection or insert hardware interlock. The instruction to compute the condition, usually a one-cycle compare instruction, can be scheduled after the instruction performing data-computing, as long as the result of the condition-computing instruction comes out before the data-computing conditional instruction uses it The conditional write-back mode determines whether the result of the conditional instruction should be written-back. The conditional write-back mode has the advantage of parallel execution of condition determination and data computing with the performance approximating ASIC design. This is an advantage that the conventional processor fails to deliver.

Figure 1:
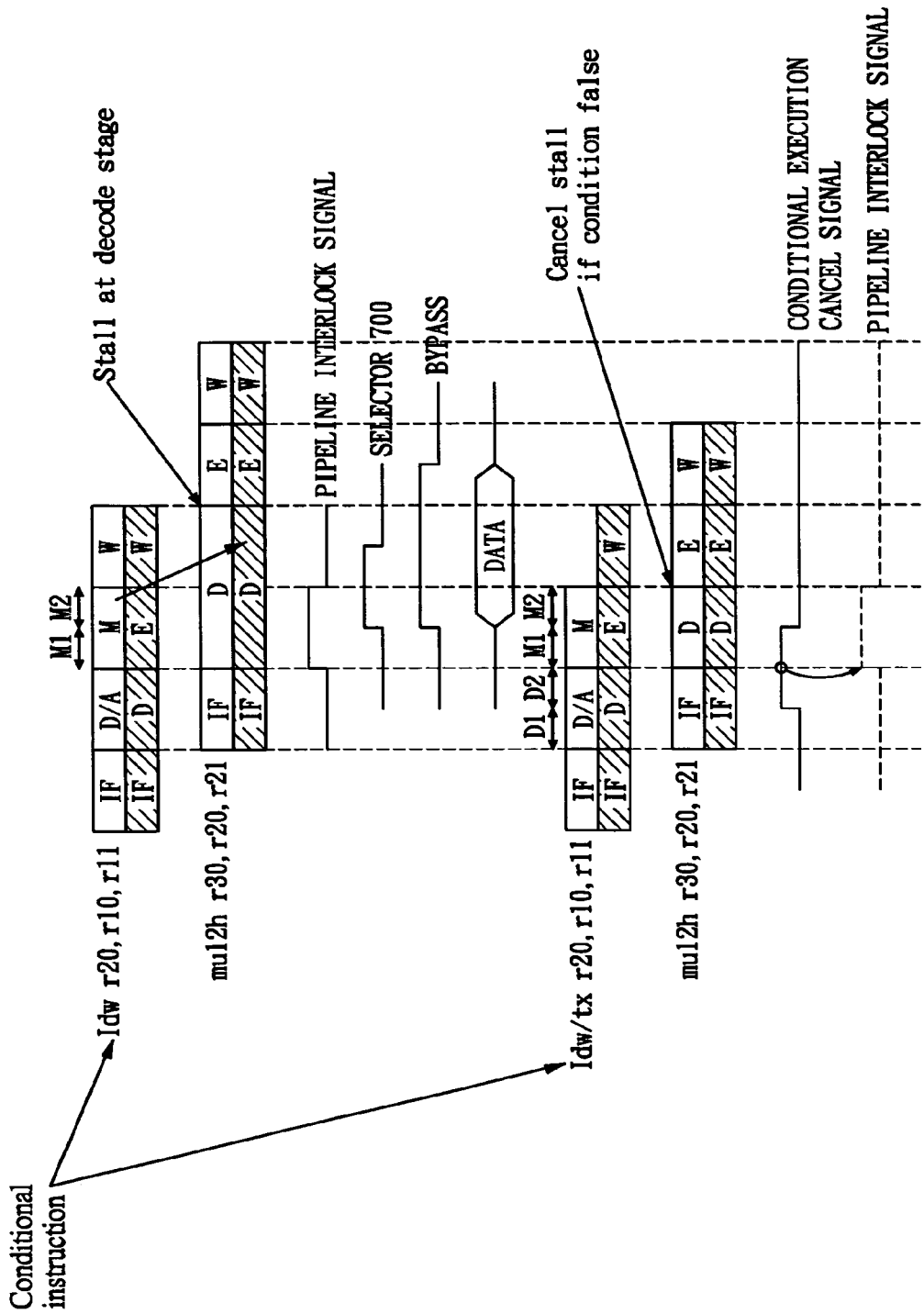
FIG. 1 is a timing chart showing a conventional pipeline interlock cancel process for multiplication data executed in a conventional microprocessor having conditional execution instructions.
Figure 2:
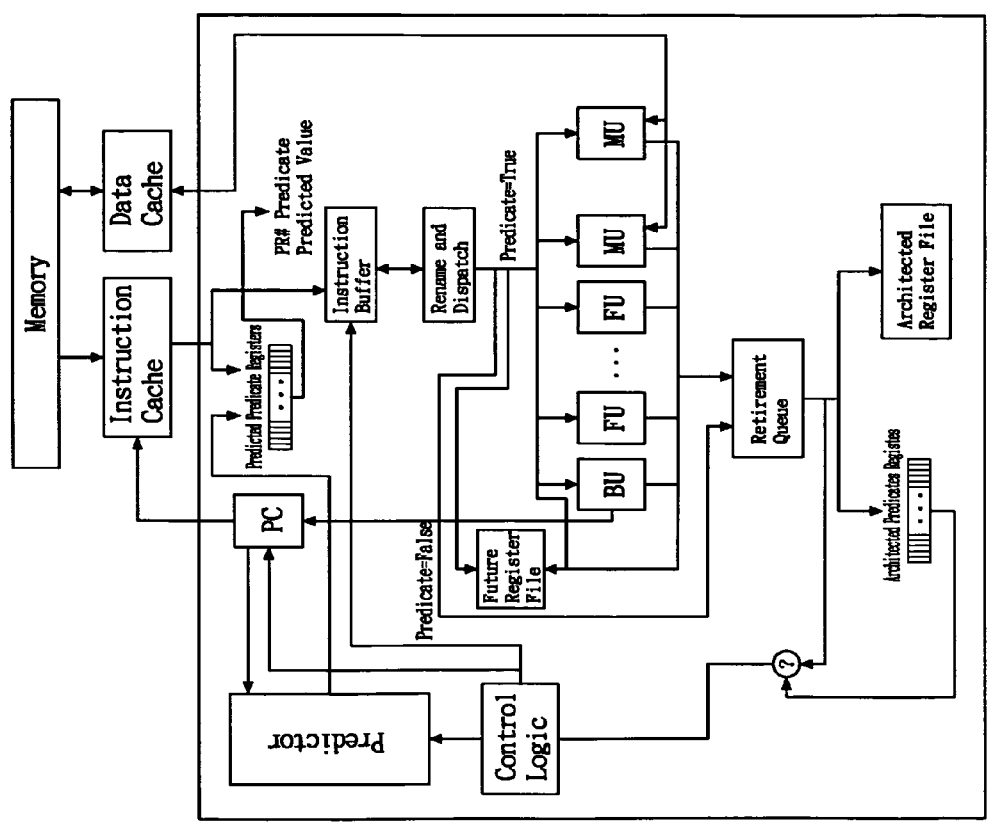
FIG. 2 is a diagram illustrating a conventional method for performing out-of-order superscalar execution with predicate prediction.
Figure 3:
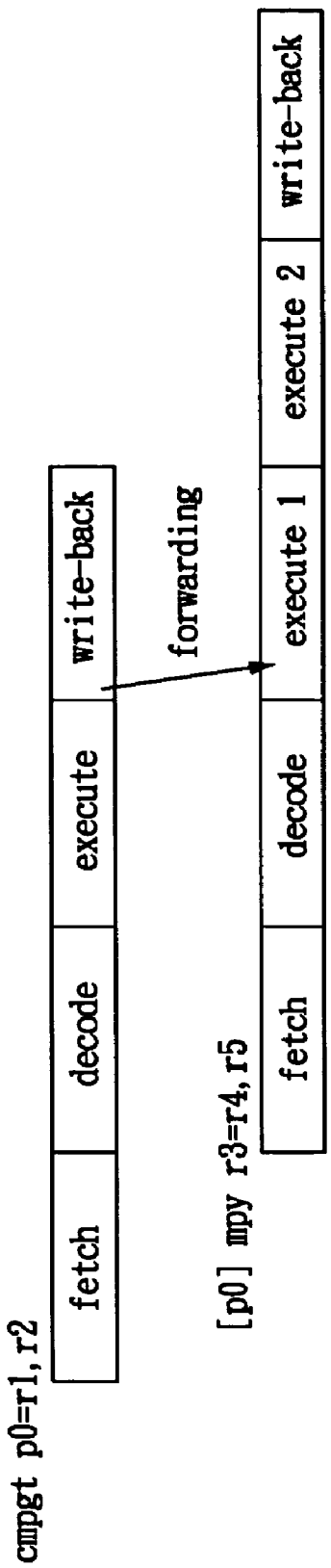
FIG. 3 shows a conventional pipeline behavior in which the conditions are interpreted at the first execution stage.
Figure 4:
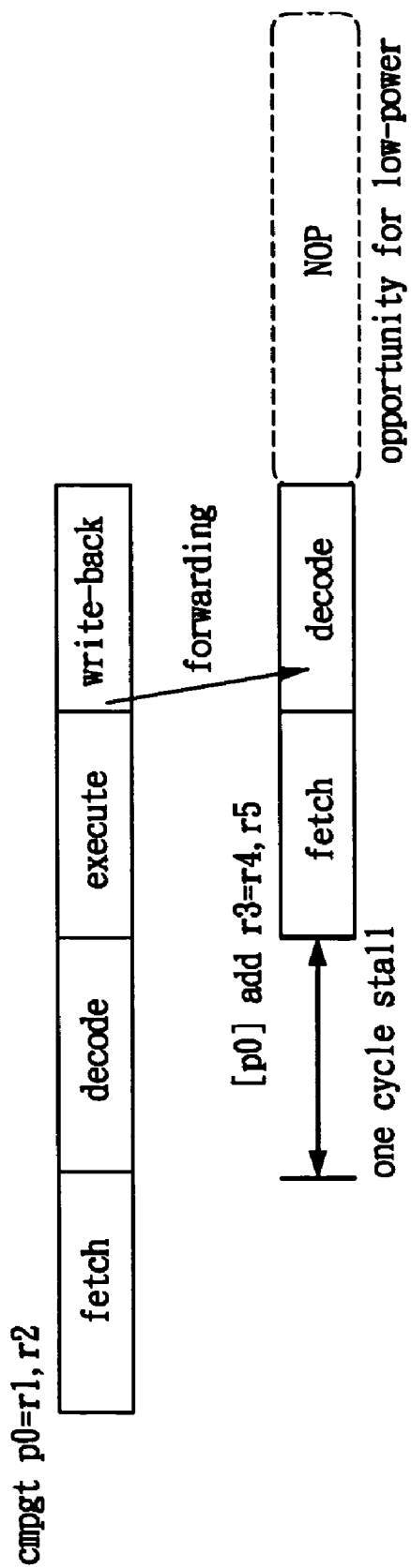
FIG. 4 shows a conventional pipeline behavior in which the conditions are interpreted and executed at the decode stage.
Figure 5:
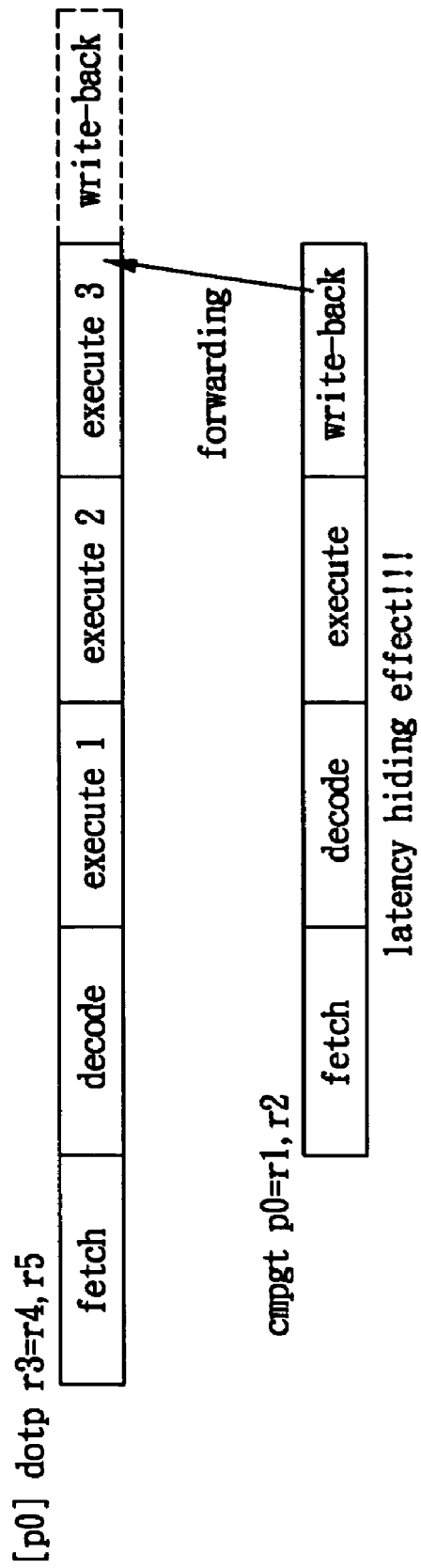
FIG. 5 shows a conventional pipeline behavior in which the conditions are interpreted at the last execution stage.
Figures 6A, 6B:
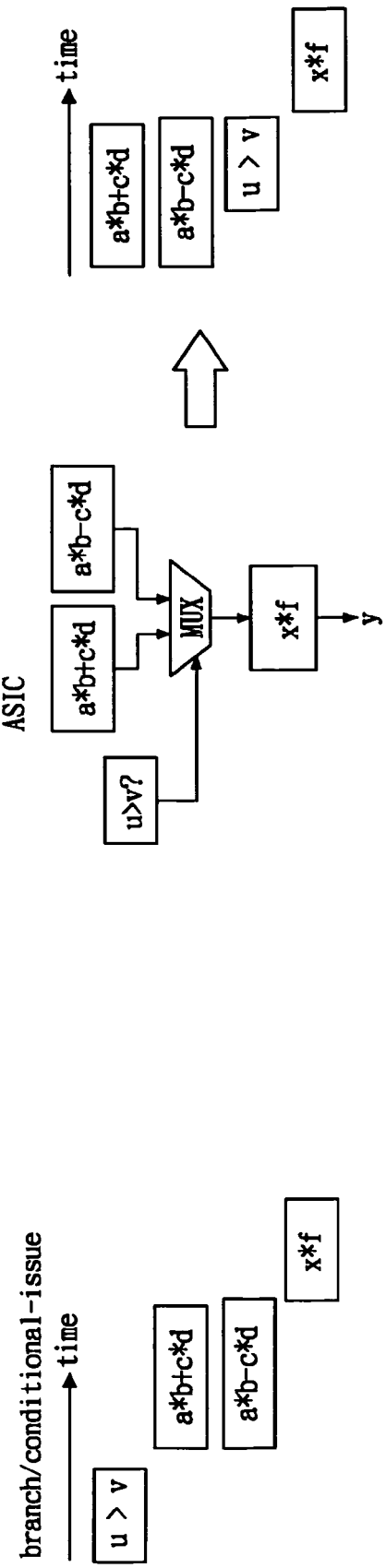
FIG. 6A and FIG. 6B show the timing of an if-then-else statement execution using a conventional branch/conditional issue mode and using ASIC architecture, respectively.
Figure 8:
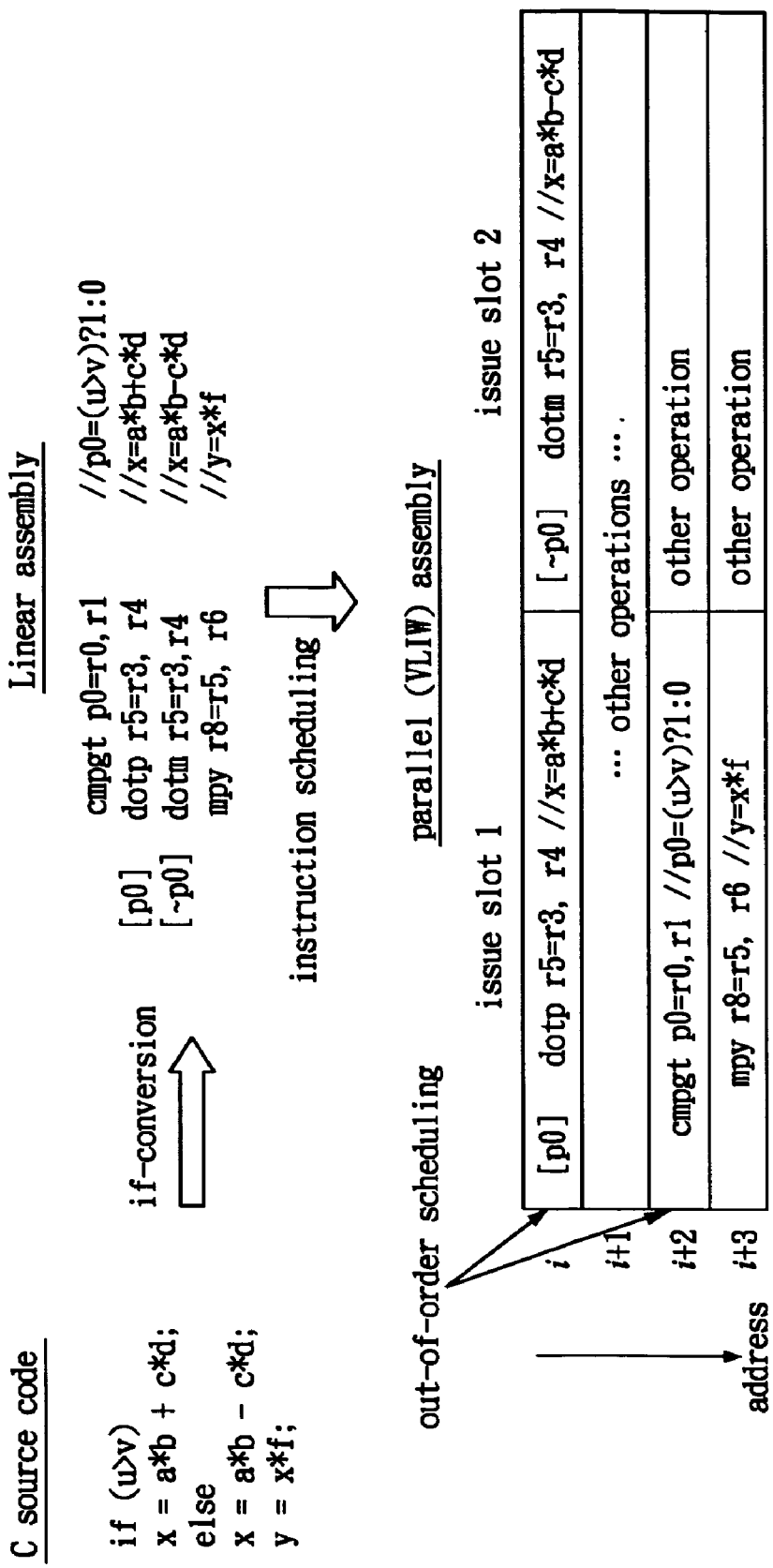
FIG. 8 shows an example of out-of-order-scheduling to support the conditional write-back mode according to the present invention.

In order to support the conditional write-back mode, the compiler for the VLIW processor must perform different instruction scheduling scheme. In the energy-saving mode, i.e. conditional issue mode, the compiler schedules the instructions in an in-order-scheduling fashion to arrange the execution time for each instruction, as in a conventional VLIW processor. In high-performance mode, i.e. conditional write-back mode, the compiler schedules the instructions in an out-of-order-scheduling fashion to arrange the pipeline behavior for each conditional instruction. FIG. 8 shows an example of out-of-order-scheduling to support the conditional write-back mode according to the present invention. The original C source code is compiled using the if-conversion technology into a linear assembly code, which is then into a parallel assembly code. As shown in FIG. 8, the comparison instruction cmpgt is scheduled prior to the computing instructions dotp and dotm in the linear assembly code. After scheduling, the comparison instruction cmpgt is arranged to be after the computing instructions dotp and dotm in the parallel assembly in order to realize the pipeline behavior of FIG. 5.

Figure 9A:
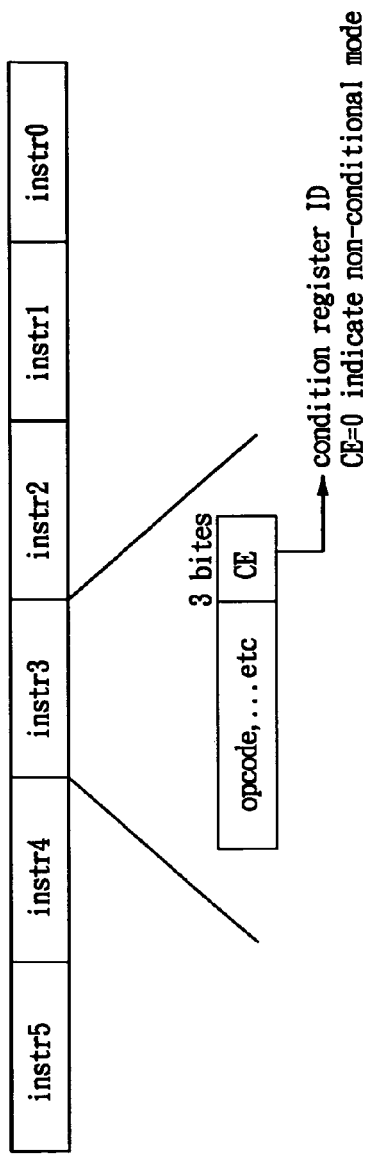
FIG. 9A shows a schematic view of the instruction format for supporting conditional execution according to the present invention.

FIG. 9A shows a schematic view of the instruction format for supporting conditional execution according to the present invention. As shown in FIG. 9A, a VLIW instruction set includes six independent instruction fields instr5-instr0, and any of them can be set as conditional mode indicated by a 3-bit field CE (i.e. condition register ID). In the VLIW processor of FIG. 7, register file 704 includes 32 general purpose registers R0-R31. When CE=0, it indicates the instruction is in the non-conditional mode. Otherwise, a non-zero CE indicates one of the registers R4, R8, R12, R16, R20, R24, R28, whose least significant bit is the source of the condition, as described in the following paragraph.

Figure 9B:
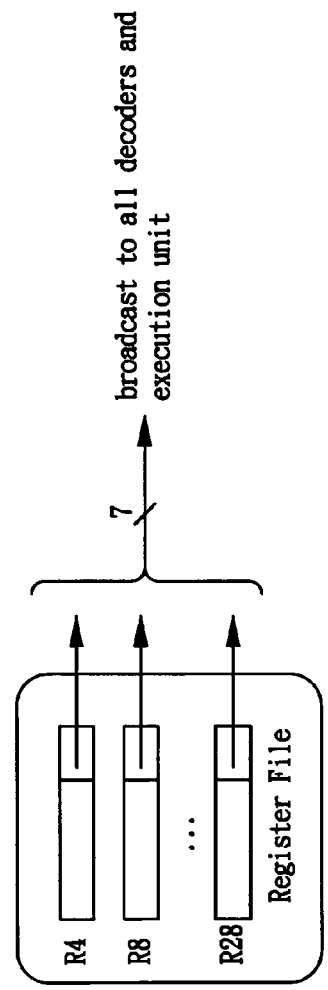
FIG. 9B illustrates register file support according to the present invention.

To support conditional execution, register file 704 requires special design. In the present invention, the least significant bits of the 7 registers (R4, R8, R12, R16, R20, R24, R28) that can be used as the condition source are designed to broadcast to other parts of the processor, such as all decoders and execution units, through the operation of the forwarding circuit (not shown) in the register file. Thereby, the most up-to-date condition can be available to other parts of the processor when an instruction for investigating a condition executes at write-back-stage. This is illustrated as FIG. 9B, in which write-port is forwarded to read-port and write-out condition bits are broadcasted to all decoders and execution units.

With such a special instruction format and the support of compiler and register file, an instruction can be used to switch between two conditional modes, i.e. conditional issue mode and conditional write-back mode. The conditional issue mode resolves the condition at decode stage, while the conditional write-back mode resolves the condition at the last execution stage. The more details of the decode stage and execution stage will be described in the followings.

Figure 10:
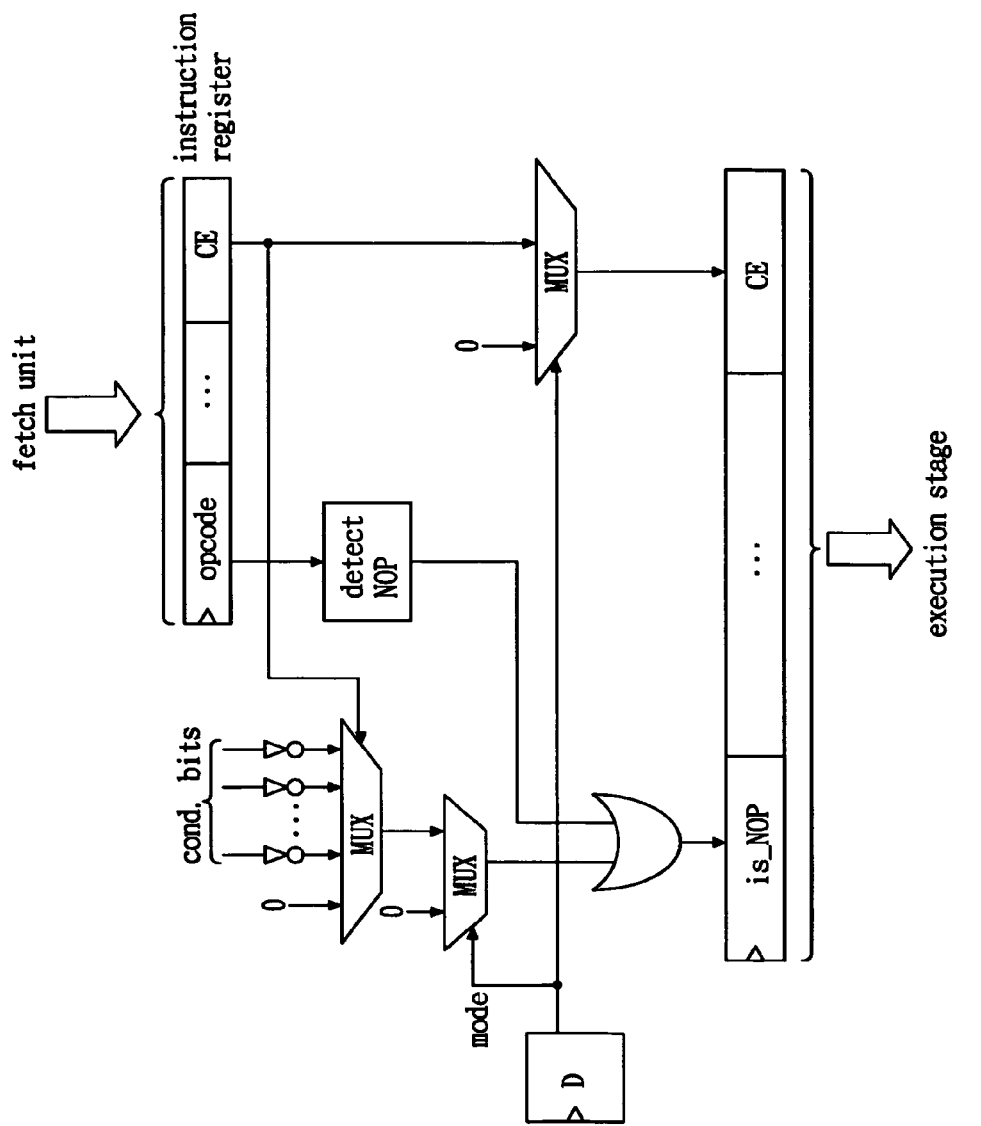
FIG. 10 shows a schematic view of an instruction decoder supporting dual-mode conditional execution according to the present invention.

FIG. 10 shows a schematic view of an instruction decoder supporting dual-mode conditional execution according to the present invention. The purpose of the instruction decoder is to control whether an instruction is executed or the execution results are written back by the instruction. The instruction decoder receives an instruction from fetch unit 701 and places it in the instruction register. In addition to the opcode decoding operation as in a conventional VLIW processor, instruction decoder 702 includes circuitry to set an is_NOP field and CE field before handing the decoded instruction to the execution stage.

Figure 11A:
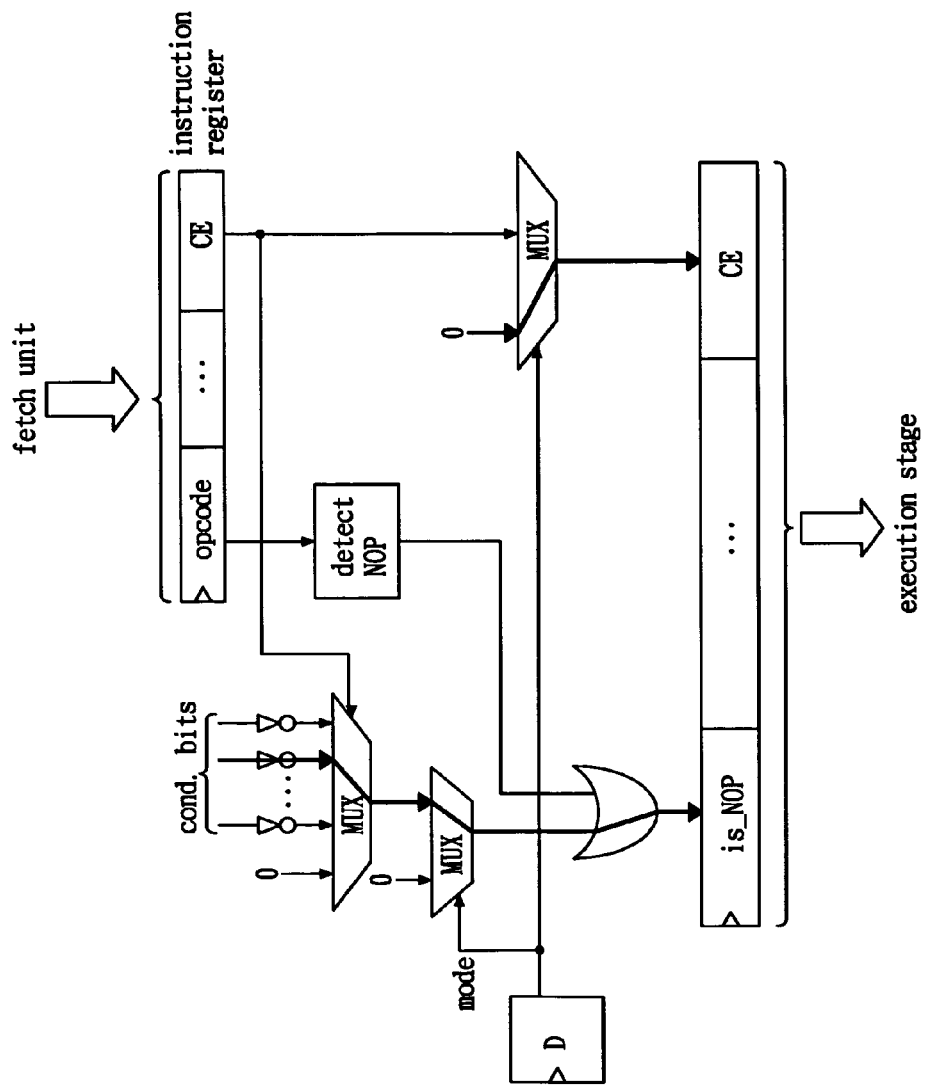
FIG. 11A shows the decoding operation and the setting path of the is_NOP field and CE field in the conditional issue mode.
Figure 11B:
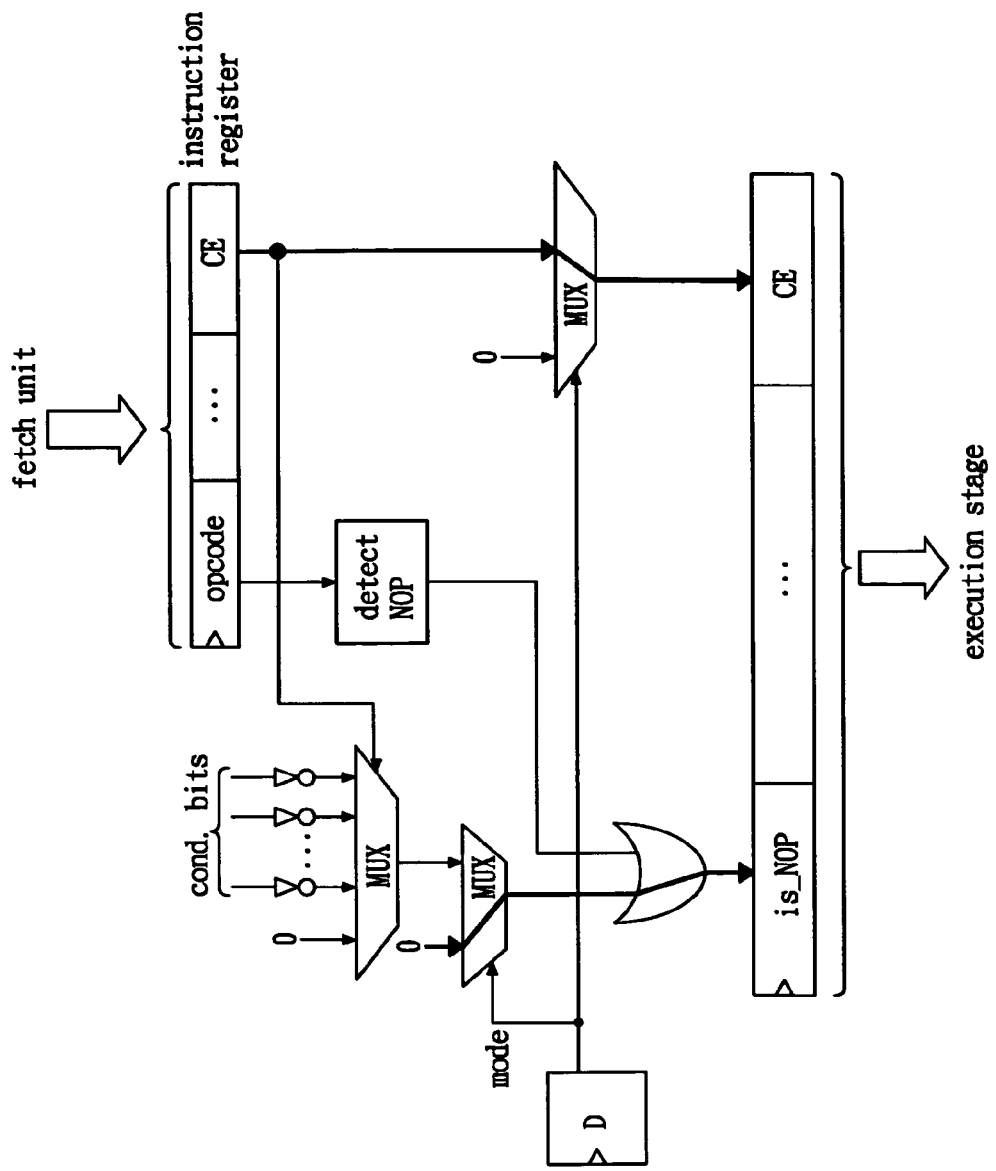
FIG. 11B shows the decoding operation and the setting path of the is_NOP field and CE field in the conditional write-back mode.

FIG. 11A shows the decoding operation and the setting path of the is_NOP field and CE field in the conditional issue mode, and FIG. 11B shows the decoding operation and the setting path of the is_NOP field and CE field in the conditional write-back mode. As shown in FIG. 11A, when the processor operates in the conditional issue mode, the is_NOP field is set according to the condition bits broadcasted by register file, and the CE field is directly set as non-conditional. When the condition is false, the instruction is set as NOP. When the condition is true, the instruction is in non-conditional mode. As shown in FIG. 11 B, when the processor operates in the conditional write-back mode, the CE field is sent directly to the execution stage for execution.

Figure 12:
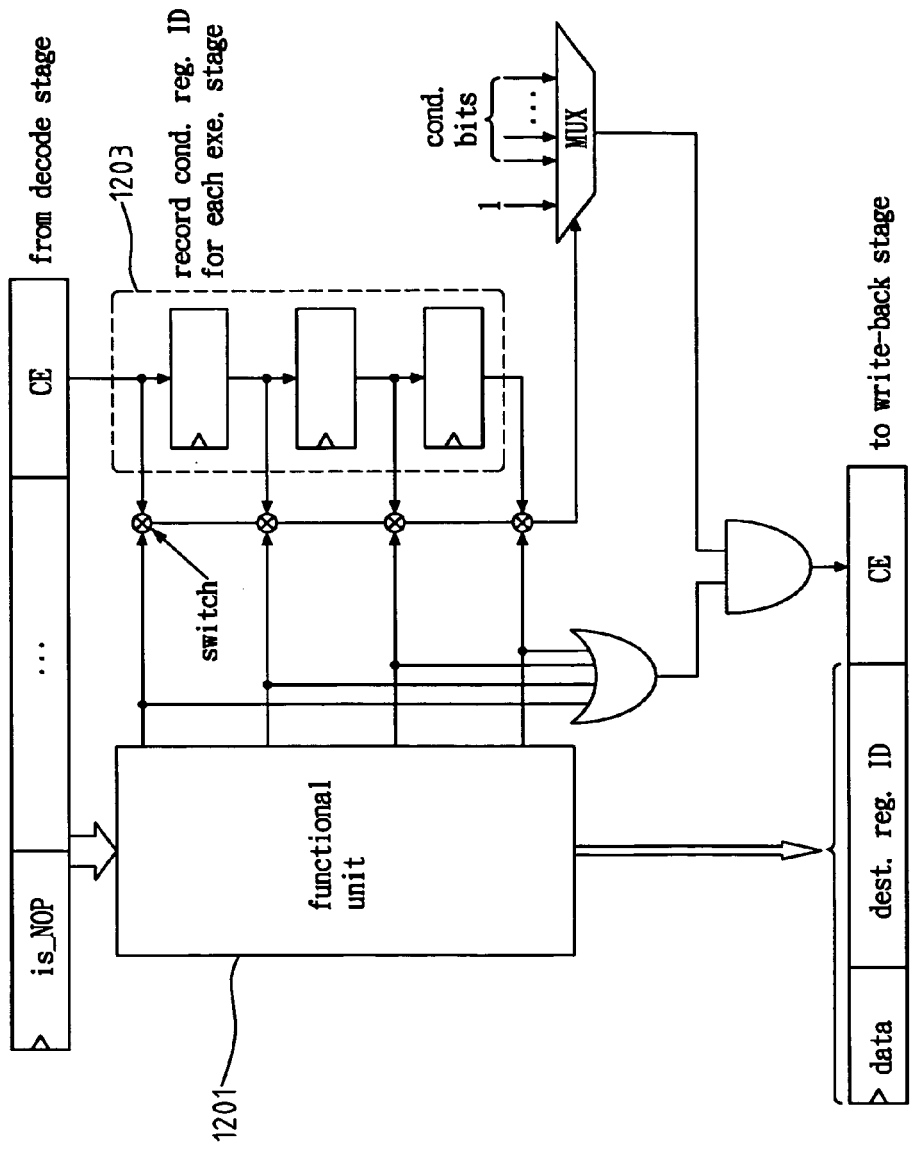
FIG. 12 shows a schematic view of an ALU with control unit supporting the execution stage of the present invention.

FIG. 12 shows a schematic view of an ALU with control unit supporting the execution stage of the present invention. For the functional unit to support pipeline execution, the CE field propagated from the decode stage must be recorded by the stages. Thereby, the ALU with control unit mainly comprises a functional unit 1201 and a recording unit 1203. The functional unit 1201 determines whether to execute the operation according to the is_NOP field. The recording unit 1203 records the conditional register ID for each execution stage.

Figure 13:
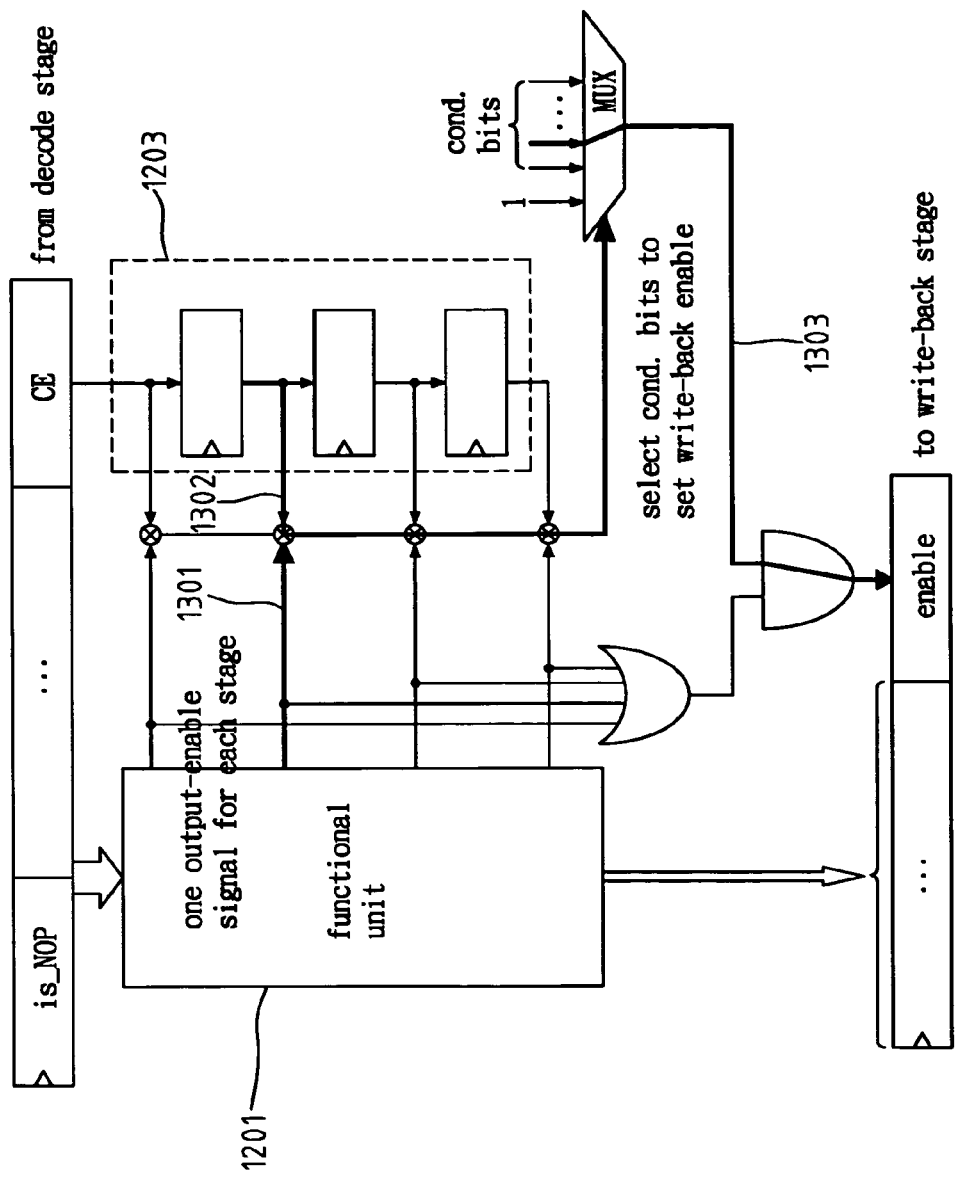
FIG. 13 shows the operation of the ALU with control unit of FIG. 12.

FIG. 13 shows the operation of the ALU with control unit Referring to FIG. 13, an output enable signal is sent when the functional unit 1201 has generated an operation result. Because different instructions have different number of stages, each execution stage has a separate output enable signal line for distinguishing which instruction in the pipeline generates the operation result. By using separate stage output enable signal line to select the CE field of the instruction and the condition bit broadcasted by register file, it can be determined whether the next cycle will have a result for write-back. As shown in FIG. 13. The solid line 1301 indicates an output enable signal for a stage is generated, and the solid line 1302 indicates the CE field for the corresponding stage is selected and acknowledged to a multiplexer MUX. The solid line 1303 indicates the ALU with control unit selects the condition bit through the multiplexer MUX to set write-back enable.

As mentioned herein, the present invention also provides a method performed in the VLIW processor having such a switchable conditional execution apparatus, in which an instruction format to switch between conditional issue mode and conditional write-back mode is arranged. Different instruction scheduling schemas described above are performed by the compiler for the VLIW processor. The execution of such a VLIW instruction includes a fetch stage, a decode stage, a plurality of execution stages, and a write-back stage. For a conditional instruction, the conditional issue mode resolves conditions at the decode stage, while the conditional write-back mode resolves conditions at the last execution stage. The detailed operating and the corresponding structure for each step have been described with the accompanying drawings FIGS. 7-13.

After having reference to the FIGS. 7-13 and their corresponding operations, it can be understood that the present invention has the following features. (a) Approximate ASIC timing by conditional write-back with the compiler support for the conditional write-back. (b) Condition resolved just before write-back. (c) Software selective conditional issue and conditional write-back modes. (d) A VLIW processor without hardware interlock/dependence checking.

In summary, the apparatus of switchable conditional execution is applicable to a VLIW processor for providing dynamic switch between conditional write-back mode for high performance or conditional issue mode for energy-saving operation. The former shows a performance approximate to that of ASIC execution, and the latter can save power consumption by turning instructions into NOP at an earlier stage.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for switchable conditional execution (CE) in a very long instruction word (VLIW) processor, said apparatus comprising:

one or more instruction decoders being involved in a decode stage for loading and decoding instructions from a fetch unit, said one or more instruction decoders decoding conditional instructions for conditional execution in an energy-saving mode or a high-performance mode;

one or more arithmetic logic units (ALU) with control units, for executing the decoded instructions from said one or more instruction decoders; and a register file including a plurality of registers for storing and forwarding the executed results of said ALU with control units to said one or more instruction decoders to support said conditional execution;

wherein said apparatus has a special instruction for switching said apparatus between said energy-saving mode and said high-performance mode for scheduling and executing conditional instructions in an in-order-scheduling fashion in said energy-saving mode and in an out-of-order-scheduling fashion in said high-performance mode.

2. The apparatus for switchable conditional execution as claimed in claim 1, wherein said processor has an instruction format comprising a CE field for indicating whether an instruction is a conditional instruction, and a source of condition of the conditional instruction.

3. The apparatus for switchable conditional execution as claimed in claim 2, wherein said source of said condition of the conditional instruction is the least significant bit of a register in said register file.

4. The apparatus for switchable conditional execution as claimed in claim 3, wherein the least significant bits of said registers of said register file are used as conditional bits that are broadcasted to other parts of said processor.

5. The apparatus for switchable conditional execution as claimed in claim 4, wherein said one or more instruction decoders propagate said CE field to said ALU with control units for execution when executing in said high-performance mode.

6. The apparatus for switchable conditional execution as claimed in claim 5, wherein each of said ALU with control units further comprises a functional unit and a recording unit, said functional unit determines whether to execute opcode of an instruction according to the conditional bits broadcasted by said register file, and said recording unit records the CE field propagated by said one or more instruction decoders.

7. The apparatus for switchable conditional execution as claimed in claim 4, wherein said one or more instruction decoders block said CE field and use said conditional bits broadcasted by said register file to determine whether opcode of an instruction should be set as an NOP to save energy when executing in said energy-saving mode.

8. The apparatus for switchable conditional execution as claimed in claim 1, wherein a conditional issue mode is used to execute the conditional instructions when executing in said energy-saving mode, while a conditional write-back mode is used to execute the conditional instructions when executing in said high-performance mode.

9. The apparatus for switchable conditional execution as claimed in claim 8, wherein said conditional issue mode resolves conditions for conditional instructions at said decode stage, while said conditional write-back mode resolves conditions for conditional instructions at a last execution stage.

10. The apparatus for switchable conditional execution as claimed in claim 1, wherein for each execution stage, a corresponding output enable line is generated by a corresponding ALU with control unit for indicating a different execution stage when executing in said high-performance mode.

11. The apparatus for switchable conditional execution as claimed in claim 3, wherein said register file further includes a forwarding circuit to broadcast the least significant bits to other parts of said processor.

12. The apparatus for switchable conditional execution as claimed in claim 1, wherein said apparatus is a digital signal processor.

13. A switchable conditional execution method performed in a very long instruction word (VLIW) processor, said method comprising the steps of:
 (a) arranging an instruction format for the VLIW processor to switch between two conditional modes including a conditional issue mode and a conditional write-back mode;
 (b) decoding conditional instructions using said instruction format for conditional execution in said conditional issue mode or said conditional write-back mode;
 (c) dividing the execution of a VLIW instruction into a fetch stage, a decode stage, a plurality of execution stages, and a write-back stage; and
 (d) resolving condition of a conditional instruction in said conditional issue mode at said decode stage, while resolving condition of a conditional instruction in said conditional write-back mode at a last execution stage.

14. The switchable conditional execution method as claimed in claim 13, wherein said method uses a special instruction for switching said processor between an energy-saving mode and a high-performance mode, and said conditional issue mode is used to execute the conditional instructions in an energy-saving mode, while said conditional write-back mode is used to execute the conditional instructions in a high-performance mode.

15. The switchable conditional execution method as claimed in claim 13, wherein conditional instructions are scheduled and executed in an in-order-scheduling fashion in said conditional issue mode, and in an out-of-order-scheduling fashion in said conditional write-back mode.

* * * * *